United States Patent [19]

Lozman

[11] Patent Number: 5,689,651
[45] Date of Patent: Nov. 18, 1997

[54] SYSTEM FOR PROCESSING AND DISPLAYING FINANCIAL INFORMATION

[76] Inventor: Fane Lozman, 601 E. 32nd St., #805, Chicago, Ill. 60616

[21] Appl. No.: 322,422

[22] Filed: Oct. 13, 1994

[51] Int. Cl.$^6$ .................................................. G06F 19/00
[52] U.S. Cl. ........................................................ 395/237
[58] Field of Search ................................ 364/401, 408, 364/401 R

[56] References Cited

U.S. PATENT DOCUMENTS

| | | |
|---|---|---|
| 4,486,853 | 12/1984 | Parsons . |
| 4,677,552 | 6/1987 | Sibley, Jr. ................... 364/408 |
| 5,038,284 | 8/1991 | Kramer . |
| 5,191,523 | 3/1993 | Whitesage ................ 364/401 R |
| 5,193,056 | 3/1993 | Boes ............................ 364/408 |
| 5,222,019 | 6/1993 | Yoshino et al. . |
| 5,233,513 | 8/1993 | Doyle . |
| 5,245,535 | 9/1993 | Weiss et al. . |
| 5,262,942 | 11/1993 | Earle . |
| 5,270,922 | 12/1993 | Higgins . |
| 5,274,752 | 12/1993 | Kawazome . |
| 5,285,383 | 2/1994 | Lindsey et al. . |
| 5,297,032 | 3/1994 | Trojan et al. . |
| 5,339,392 | 8/1994 | Risberg et al. .............. 364/408 |

*Primary Examiner*—Donald E. McElheny, Jr.

[57] ABSTRACT

A system for processing and displaying financial market data corresponding to user selected primary and secondary symbols having a programmable computer with a display. A communication device is connected to the computer for receiving the financial market data from an external data source. The computer has software for selecting the primary and secondary symbols from the financial market data and for displaying the data corresponding to the primary symbol on a central portion of the display and displaying the data corresponding to the secondary symbols on a peripheral portion of the display and periodically updating the data corresponding to the selected primary and secondary symbols.

20 Claims, 12 Drawing Sheets

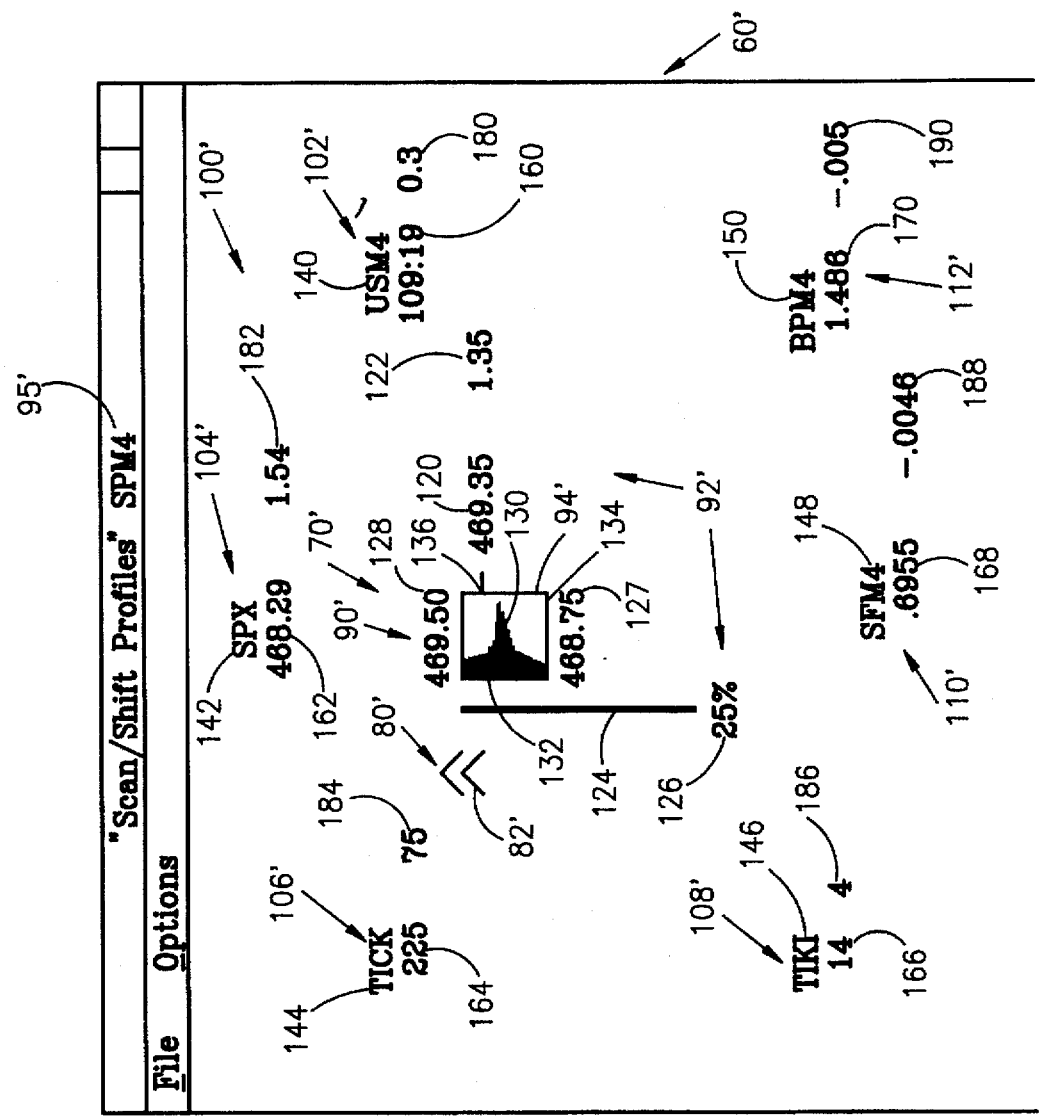
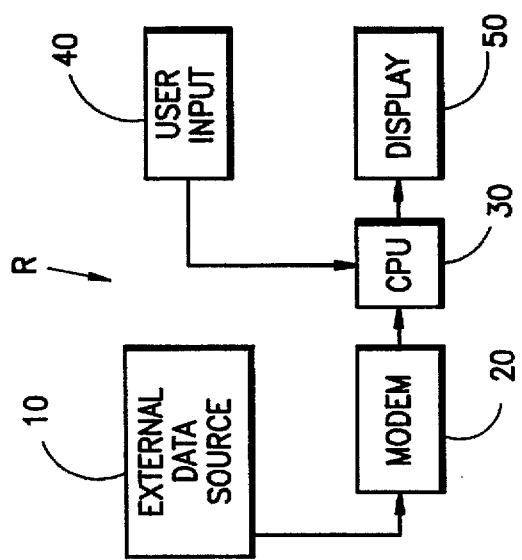
FIG. 1
FIG. 3

SYSTEM FOR PROCESSING AND DISPLAYING FINANCIAL INFORMATION

FIELD OF THE INVENTION

The present invention relates generally to data processing and displaying systems and more specifically, to systems for processing and efficiently displaying financial market information.

BACKGROUND OF THE INVENTION

The trading of financial instruments such as stocks, bonds, commodities and currencies has largely become a computer supported operation. Almost all significant trading and monitoring of securities is accomplished by using computers. In the past, traders typically used systems that processed and displayed the market information generally in an alphanumeric format and in straight column/row displays. The alphanumeric displayed information could not be optimized to permit rapid extraction and review of the data to support trading. Further, the displayed information was mostly devoid of market trend information and the traders had to mostly rely on intuition and luck in predicting market shifts. The appreciation of these problems formed the stimulus to the present invention.

OBJECTS AND SUMMARY OF THE INVENTION

It is therefore an object of the present invention to provide a system which increases the efficiency of a trader's ability to review and extract market information.

It is another object of the present invention to provide a system in communication with an external data source which permits the retrieval of financial market information.

It is still another object of the present invention to provide a system for the real time processing and displaying of financial market data into a form which increases a trader's performance.

It is yet another object of the present invention to provide a system which periodically updates displayed market data.

It is still another object of the present invention to provide a system that permits a trader to efficiently monitor alphanumeric and graphic indicators of the market activity and data.

It is another object of the present invention to provide a system that displays selected financial market information in a hub and spoke format.

It is yet another object of the present invention to provide a system that displays market information corresponding to a selected primary symbol in a central portion of a display and displays market information corresponding to selected secondary symbols in a peripheral portion of the display.

It is another object of the present invention to provide a system that displays a graphic indicator in a central portion of a display, the graphic indicator corresponding to the strength and weakness in selected market conditions.

It is a further object of the present invention to provide a system that displays a graphic indicator in a central portion of a display, the graphic indicator representing the current day's price action relative to previous days' price action for a selected market symbol.

In summary, the present invention is directed to a device for processing and displaying financial market data corresponding to user selected primary and secondary symbols having a programmable computer with a display. A communication device is connected to the computer for receiving the financial data from an external data source. The programmable computer includes software that allows the user to select the primary and secondary symbols from the financial market data. The software also displays the financial data corresponding to the selected primary symbol within the central portion of the display and displays the financial data corresponding to the selected secondary symbols within a peripheral portion of the display. The software also updates the data corresponding to the selected primary and secondary symbols.

The present invention is further directed to a method for processing and displaying financial market data corresponding to user selected primary and secondary symbols by providing a programmable computer with a display and a communication device, and receiving financial market data corresponding to the selected primary and secondary symbols from an external data source through the communication device, and inputting the received data to the computer, and displaying the selected data corresponding to the selected primary symbol within a central portion of the display and displaying the selected data corresponding to the selected secondary symbols within a portion of the display peripheral to the central portion of the display, and periodically updating the displayed data from the external data source.

These and other objects and advantages of the present invention will become apparent from a consideration of the following detailed description taken in conjunction with the accompanying drawings.

BRIEF DESCRIPTIONS OF THE DRAWINGS

FIG. 1 is a block diagram of the salient elements of the present invention;

FIG. 3 is an illustrative example of a multi-object display of the present invention displayed in the format of the preferred embodiment as similarly shown in FIG. 2;

DETAILED DESCRIPTION OF THE INVENTION

The present invention is directed to a specifically programmed computer display system to improve a trader's performance in security or commodity transactions. The system is integrated with an on-line, real time, securities or commodities related information database managed by an external organization. It is from this database that vital information on past and current market conditions is continuously communicated to the system.

The system efficiently displays and continuously updates quote information and graphic and numeric indicators on trade transactions such as occur in typical securities and commodities trading.

The user defines a primary symbol and a plurality of secondary symbols for which corresponding quote information is to be monitored on a display. The displaying of the primary symbol and the secondary symbols and the corresponding market information, occurs in a hub-spoke configuration. Hub-spoke configuration is my term for the primary symbol being displayed in the hub or a centralized area of the display and the secondary symbols being displayed in a spoke or peripheral pattern about the primary symbol. Various graphic and numeric indicators, calculated from information from the primary and secondary symbols, can also be displayed in the hub near the primary object at the option of the user.

Referring now to FIG. 1, there is shown in block diagram form, an improved displaying and data processing apparatus R for communicating information characterizing financial markets. External Data Source (EDS) 10 is a remotely located data processing apparatus for communicating data characterizing the financial markets. The data generated is well known to those skilled in the art. Such information typically includes current prices, previous days closing prices, volume traded, and like financially relevant data. EDS 10 is linked, via a modem 20 or other communication device, to a Central Processing Unit (CPU) 30 located remotely from EDS 10, such as on-site within the user's organization.

Associated with CPU 30 is a user input 40, such as a keyboard or mouse, and a display 50. The CPU 10 is specifically programmed in accordance with the present invention to enhance and support a user's work. The program P (see FIG. 4), among other things, continuously receives, stores and updates specific market information from EDS 10, organizes information, and efficiently displays in accordance with the present invention textual and graphic information of particular interest to a user.

Figure 2:
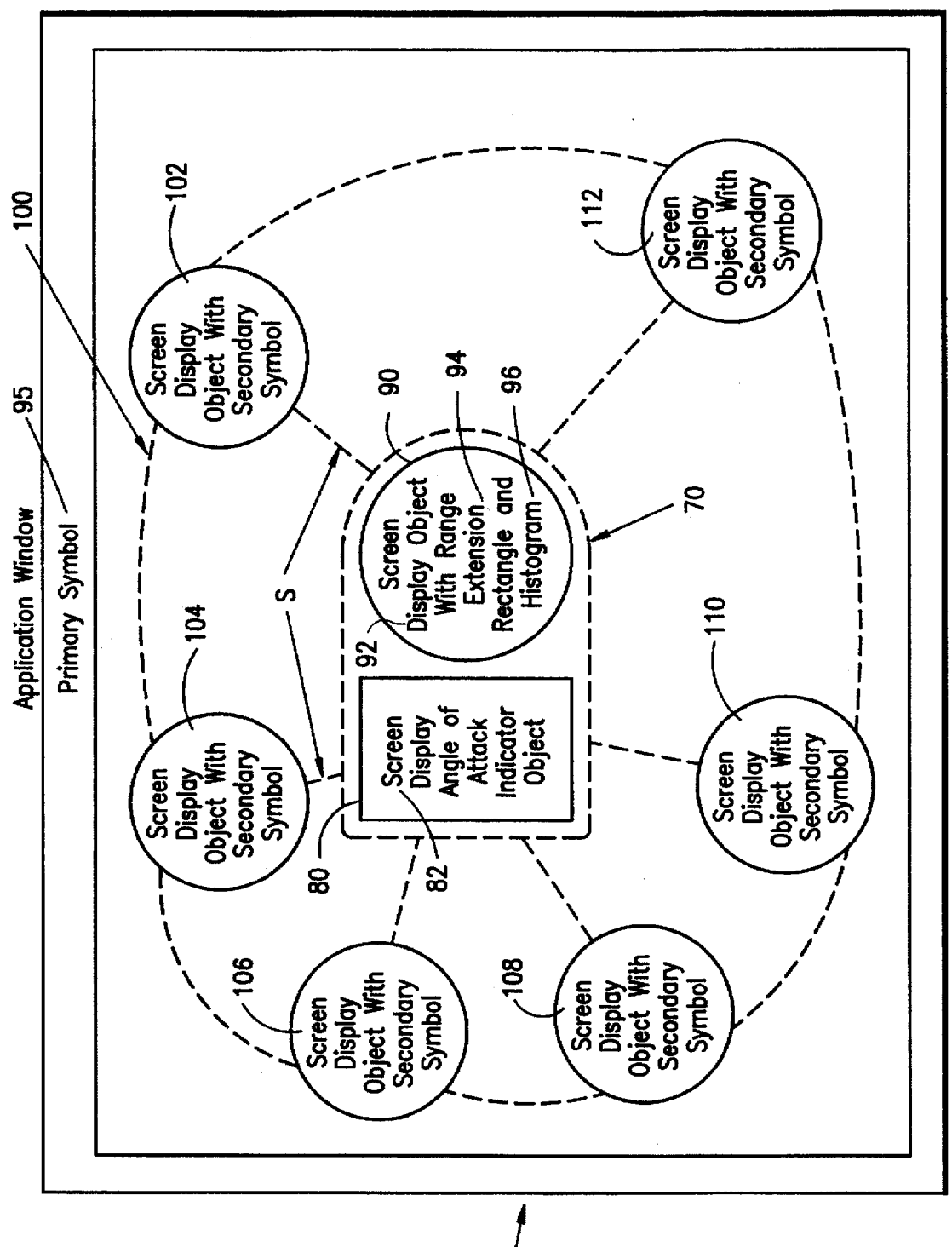
FIG. 2 is an illustrative preferred embodiment of a multi-object display of the present invention.

A multi-object screen display 60 generated by the program is shown in FIG. 2. Screen display 60 comprises a generally and spoke format. The hub or the central portion of screen display 60 has a primary display region 70 which is indicated by a dashed line. Within primary display region 70 are two display fields 80 and 90. Field 80 contains Screen Display Angle of Attack Indicator Object 82 and field 90 contains Screen Display Object 92 with Range Extension Rectangle 94 and Histogram 96 (each of which will be described in more detail infra).

Primary symbol 95 is displayed at the top of screen display 60. Peripheral to primary display region 70, is secondary display region 100.

The peripheral portion of screen display 60 has a secondary display region 100 indicated by dashed lines. Within secondary display region 100 is a plurality of display fields 102, 104, 106, 108, 110 and 112, which make up the spokes S of screen display 60. Each of the display fields 102, 104, 106, 108, 110 and 112 contain a Screen Display Object (which will be described in more detail infra).

Although six display fields are shown within secondary display region 100, it is within the scope of the invention for the user to vary the number of display fields in secondary display region 100 to a greater or lesser number, depending on the user's needs and capabilities.

The hub and spoke format of screen display 60 is very important. This efficient format allows a user to monitor activity of display 60 by scanning the primary display region 70, and then going to each of the display fields in the secondary display region 100 individually and then back to the primary display region 70. This display format allows for more information to be absorbed more quickly by the user and allows a clearer understanding of the current information in the primary display region 70 and the secondary display 100.

One illustrative multi-object presentation for screen display 60 of FIG. 2 generated by the program P is shown in FIG. 3 as screen display 60' in a Microsoft Windows (trademark) format. Within primary display region 70' are primary display fields 80' and 90'. Display field 80' contains the Screen Display Angle of Attack Indicator Object 82'.

Primary display field 90' contains Screen Display Object 92' with Range Extension Rectangle 94' and Histogram 96'. The primary symbol 95' is displayed at the top of screen display 60'.

The Screen Display Angle of Attack Indicator Object 82' is shown in FIG. 3 as a double arrow pointing towards the top of screen display 60'. The Screen Display Angle of Attack Indicator Object 82' is a graphical representation of market "strength and weakness" information permitting speedier, more readily observable changes in market conditions. Although only shown in FIG. 3 as a double arrow pointing up, the Angle of Attack Indicator 82' comprises a total of five different indicators, a single down arrow or single down chevron, double down arrow or double down chevron, a central circle, a single up arrow or single up chevron, and a double up arrow or double up chevron. These five indication of "strength/weaknesses" are induced by a composite value (−1 to 1) which is calculated as follows:

1. Each of the primary and secondary symbols on the screen contain a weighting value for its momentum and a weighting value for its direction. These user defined weights sum to a total of one.

2. Each Symbol on the screen has a user defined momentum value which represents the number of ticks moved in a specified period of time.

3. Each symbol on the screen has a user defined direction value which represents the number of consecutive price changes in the same direction.

4. Each actual momentum value and direction value is represented as a percentage of its fulfillment of the relevant user definition, and after calculating every weighting value (momentum and direction) of every symbol, the composite value is thus derived as a summation of all of these values.

The user also defines what range of actual composite values shall be represented by the appropriate indicator level. This complete control of the indicator levels allows the user to define and quantify market activity to the users own' specifications, giving the user real time indication of changes in market conditions relevant to the users interests.

As shown in FIG. 3, Screen Display Object 92' includes the current trading price 120 of the primary symbol 95' and the change in price 122 of the primary symbol 95' from the previous day's closing price.

Screen Display Object 92' also includes a fixed length bar 124 representing the average price movement of a user defined period of time, such as 20-days, for the primary symbol 95', and a percentage 126 displayed at the base of bar 124 which represents a ratio of current day's price range to the average user defined period price movement.

The program P allows the change in price 122 to be omitted from screen display 60' by the user.

The Range Extension Rectangle 94' graphically represents the current day's price action relative to previous day's price action. The height of rectangle 94' is the actual value of percentage 126 of the length of fixed length bar 124. The height of the Range Extension Rectangle 94' informs the user quickly how much the prices for the primary symbol 95' have moved in the current day in comparison to how far the prices have moved on average during the previous days. The Range Extension Rectangle continuously updates and grows in length as the days trading range expands.

Displayed at the bottom of the Range Extension Rectangle 94' is the current day's low trading price 127 for the primary symbol 95'. Displayed at the top of the Range Extension Rectangle 94' is the current day's high trading price 128 for the primary symbol 95'.

Displayed within the Range Extension Rectangle 94' is a histogram or tick profile 130 representing the volume of each trading price or the total number of ticks at a specific price of the primary symbol 95' on the current day. The price is represented along the vertical axis 132 and the volume along the horizontal axis 134. Also along the vertical axis 132 is indicator mark 136, indicating the position of the current trading price 120 relative to the Range Extension Rectangle 94'.

It is within the scope of the invention for the user to have the option to display nothing within Range Extension Rectangle 94', or to display tick profile 130, or to display a number of other indicators such as a market profile graph or the mode indicator of the current primary symbol.

As shown in FIG. 3, screen display 60', which is generated by the program P, contains display fields 102', 104', 106', 108', 110' and 112' displayed within secondary display region 100' which are peripheral to primary display region 70'. Displayed within display fields 102', 104', 106', 108', 110' and 112' are secondary symbols 140, 142, 144, 146, 148 and 150 respectively.

The current trading prices 160, 162, 164, 166, 168 and 170 of each of the secondary symbols, and the current change in price 180, 182, 184, 186, 188 and 190 respectively of each of the secondary symbols, calculated from the previous day's closing price, are also displayed within display fields 102', 104', 106', 108', 110' and 112'.

The current changes in price 180, 182, 184, 186, 188 and 190 may be omitted from the screen display 60' by the user.

The program P allows the user to choose which primary symbol and corresponding graphic information is to be displayed in primary display region 70'. The program P also allows the user to choose how many secondary display fields are to be displayed in secondary display region 100' and which secondary symbols are to be displayed in the secondary display fields. Depending on how many secondary display fields are chosen, the software determines the placement of each in the secondary display region. The program P also allows the user the option of displaying the current change in price for the primary symbol or for any of the secondary symbols.

As a matter of general overall system performance (FIGS. 1–3), the user inputs the desired primary symbol and the desired secondary symbols. The EDS 10 is linked to the CPU 30. The data characterizing the financial markets is continuously transmitted to the CPU 30 enabling the program P to continuously monitor the data. When information regarding the user's primary or secondary symbols is encountered, the corresponding data is further processed by the program P, and the screen display 60 is generated or updated.

The information and calculations to create the Screen Display Object 92, the Range Extension Rectangle 94 and the Histogram 96 for display in the in primary display region 70 are obtained and performed for the primary symbol and all secondary symbols. However, they are only displayed when the symbol is chosen to be a primary symbol, i.e. displayed in primary display region 70.

Figure 4:
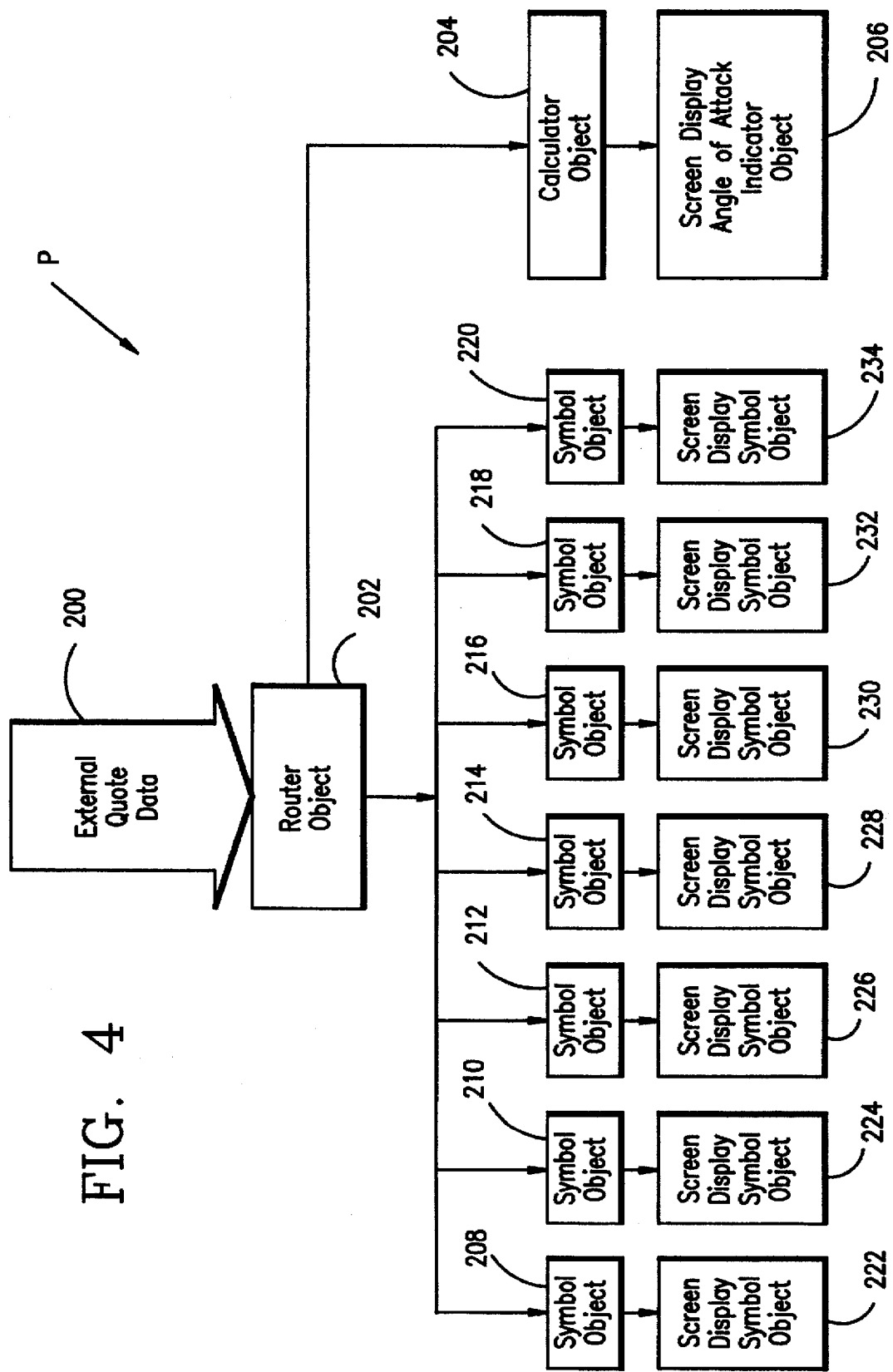
FIG. 4 is a general flow chart representation of the software utilized by the present invention.

Turning to FIG. 4, a simplified block diagram of the program P is shown. The external quote data 200, the data characterizing financial markets received from the EDS 10 (FIG. 1), is initially processed by the Router Object 202. The Router Object 202 parses incoming data, filters unwanted data, and sends data corresponding to the primary and secondary symbols on to a Symbol Object 208–220 and the Calculator Object 204. The Calculator Object 204 monitors the primary and secondary symbols and calculates a user-determined scalar value or metric based on them which can be used to signal the Angle of Attack Indicator 82 (FIG. 2).

Screen Display Angle of Attack Indicator Object 206 watches the metric calculated from all of the symbols together, and paints the corresponding Angle of Attack Indicator on the display if desired by the user.

The area of the screen where the Angle of Attack Indicator should paint is determined by the screen setup itself, but the painting is all localized within Screen Display Angle of Attack Indicator Object 206.

Symbol Objects 208, 210, 212, 214, 216, 218 and 220 retain ticks for the primary and secondary symbols for which data is received. The Symbol Objects can organize this data into a histogram and keep track of other indicators such as high, low, and variance. The Symbol Objects serve as a data store for the Screen Display Symbol Objects to use. Screen Display Symbol Objects 222, 224, 226, 228, 230, 232 and 234 mediate between the data stored in the Symbol Objects and the Screen Display itself. The Screen Display Symbol Objects are each assigned a position on the display by the arrangement function of the Screen, and the data is read from the Symbol Objects as the Symbol Objects updates themselves. Each Display Symbol Object is responsible for keeping its region of the screen up to date.

Figure 5:
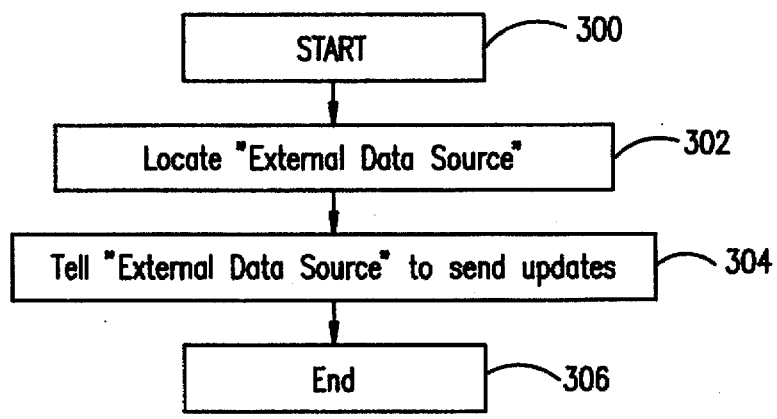
FIG. 5 is a flow chart representation of the Router Object on Initialization routine.
Figure 6:
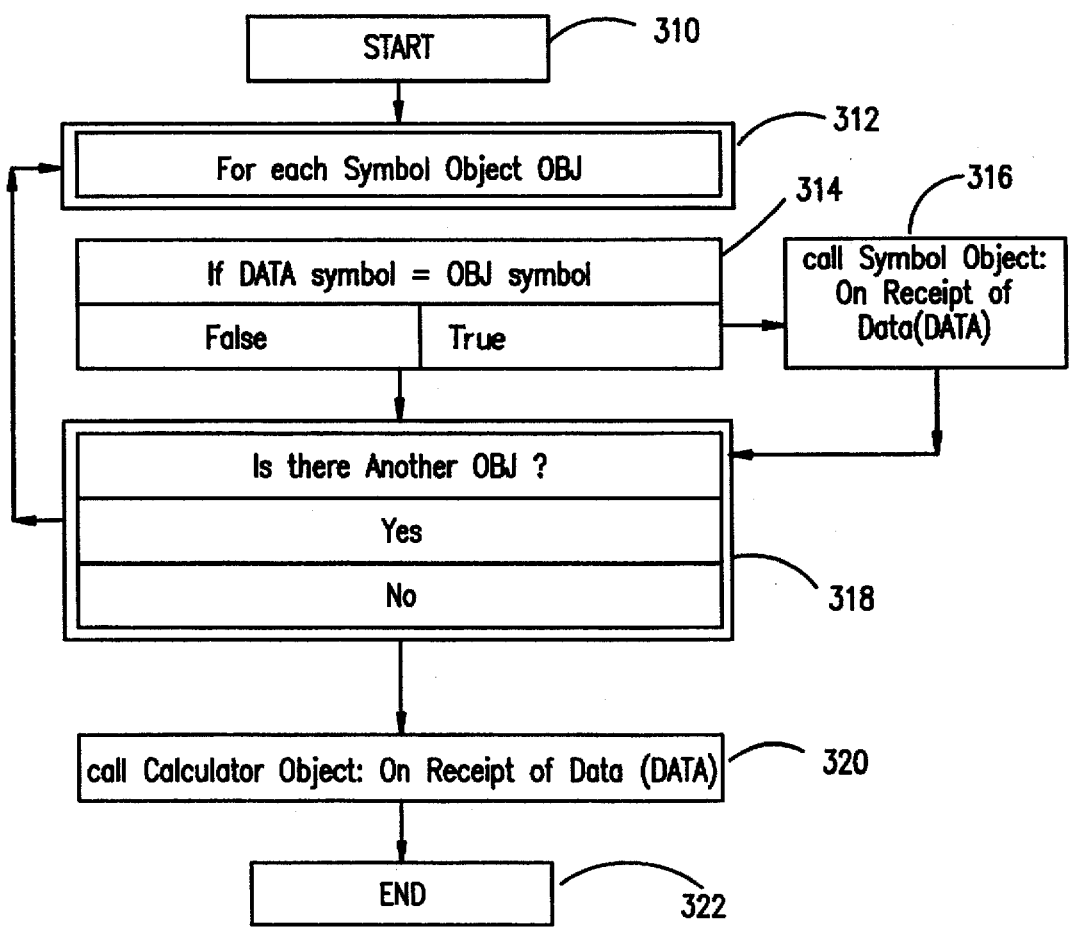
FIG. 6 is a flow chart representation of the Router Object on Receipt of Data(DATA) routine.

The flow charts of FIGS. 5 & 6 and the following pseudocode methods present the operative methods of Router Object 202 (FIG. 4). The pseudocode methods for Router Object 202 are as follows:

---

On Initialization:

Locate my "External Data Source"
    Tell "External Data Source" to send updates by
        calling my method ::On Receipt of Data On receipt of Data (DATA):

For each Symbol Object OBJ
        call OBJ::Receipt of Data (DATA)
    Locate my "Calculator Object" CALC
    call CALC::On Receipt of Data (DATA)

---

Turning to FIG. 5, logic begins at start block 300 indicating the beginning of routine Router Object on Initialization. At block 302, the system locates and connects to an external data source for supplying the market information. Once connected, logic proceeds to block 304 where the system retrieves the market data from the external data source, whereupon the routine Router Object on Receipt of Data(DATA) (FIG. 6) is executed. Block 306 ends routine Router Object on Initialization.

Figure 7:
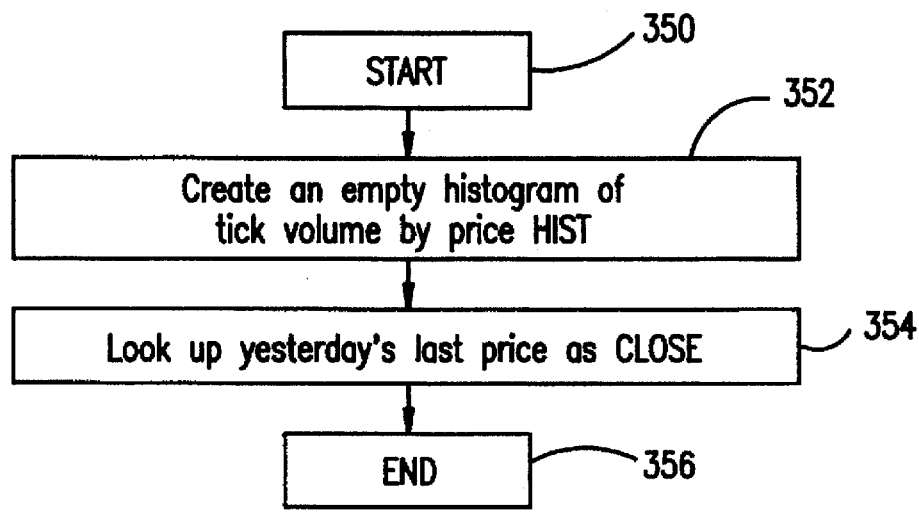
FIG. 7 is a flow chart representation of the Symbol Object on Initialization routine.
Figure 8:
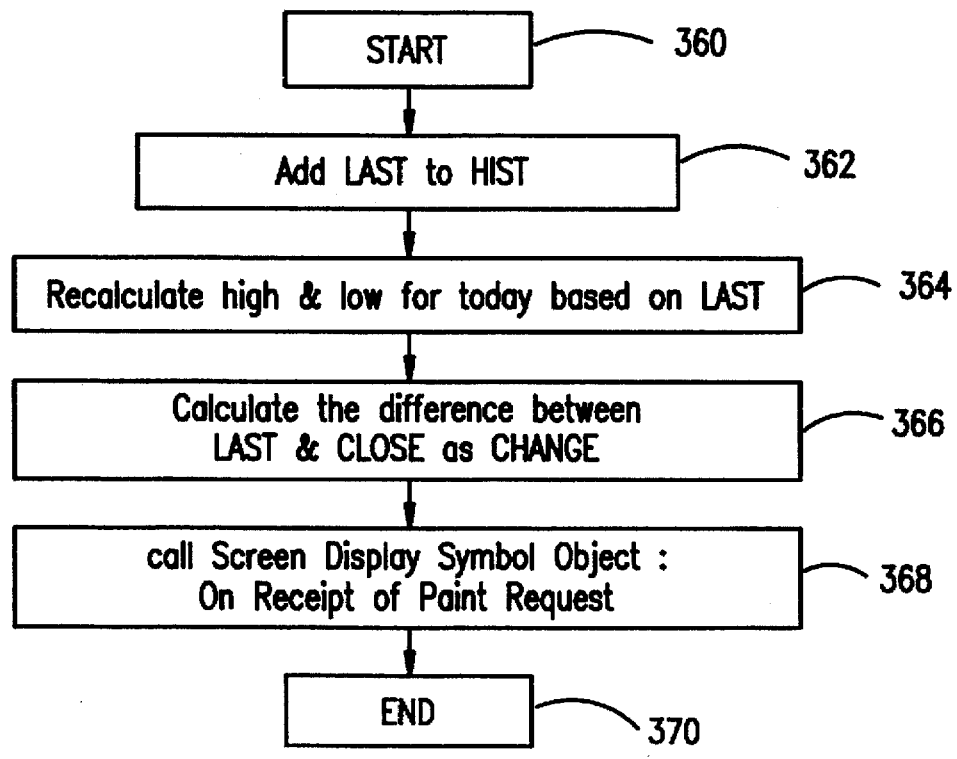
FIG. 8 is a flow chart representation of the Symbol Object on Receipt of Data(LAST) routine.
Figure 11:
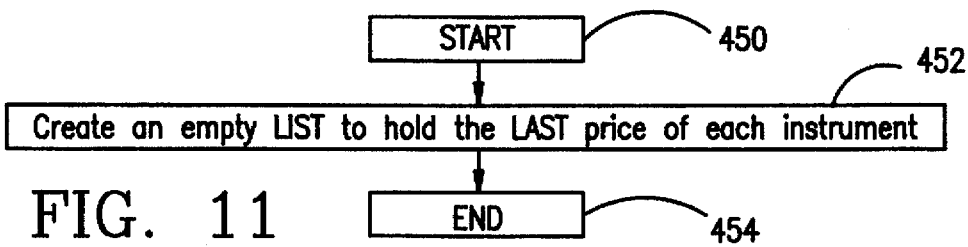
FIG. 11 is a flow chart representation of the Calculator Object on Initialization routine.
Figure 12:
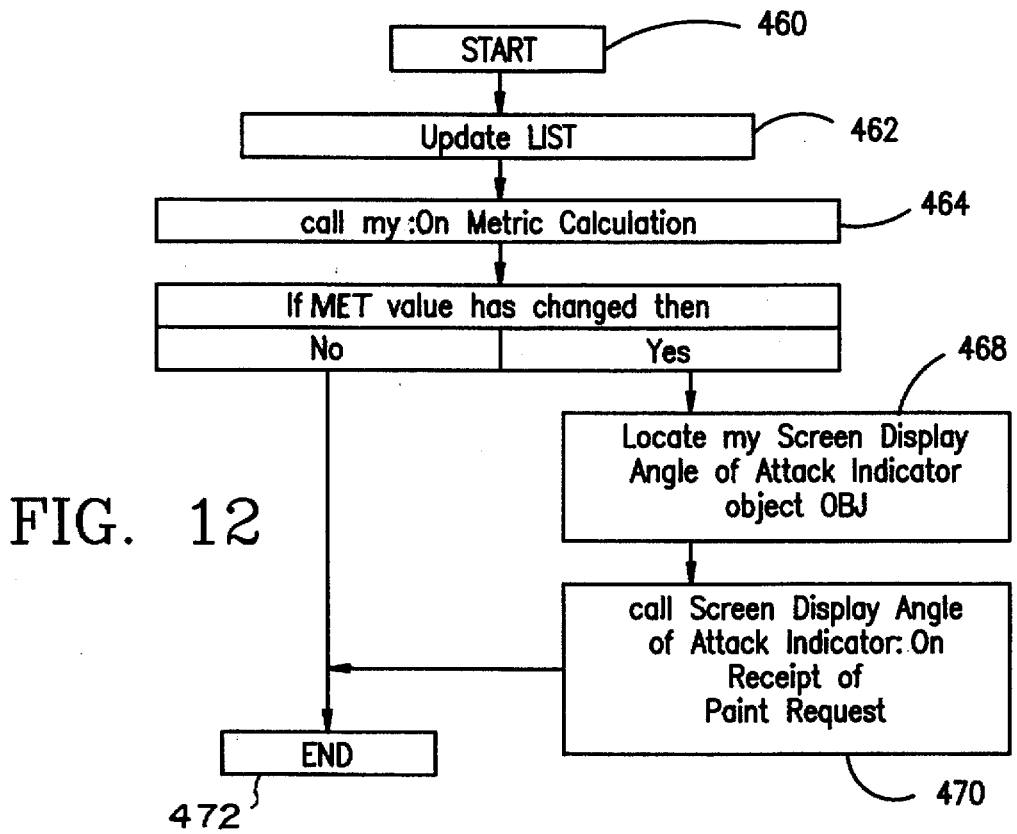
FIG. 12 is a flow chart representation of the Calculator Object on Receipt of Data(DATA) routine.
Figure 13:
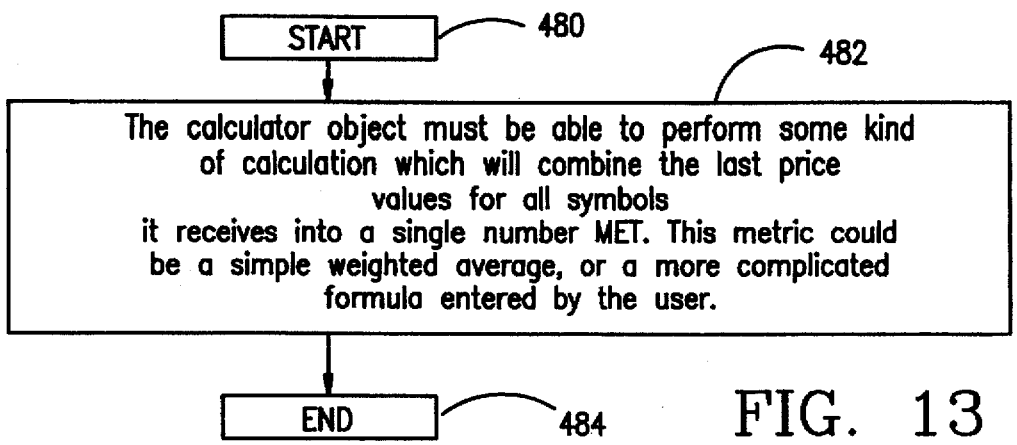
FIG. 13 is a flow chart representation of the Calculator Object on Metric Calculation routine.

Turning to FIG. 6, logic begins at start block 310 indicating the beginning of routine Router Object on Receipt of Data. Test 312 compares the market data for a specific commodity, stock, bond or currency from the external data source with the data required for each of the user selected primary and secondary symbols. Block 314 determines the results of the comparison. If the data from the external data source is not required by either of the primary or secondary symbols, the information is ignored or filtered out of the system. If the data from the external data source is required by either the primary or secondary symbols, the Symbol Object routine shown in FIGS. 7 and 8 is executed via block 316. If the data is not required or upon returning from Symbol Object routine, Block 318 permits the system to continue checking the external market data until all the information required by the primary and secondary symbols has been received. If block 318 determines all the information has been received, the Calculator Object routine shown in FIGS. 11, 12 & 13 is executed by block 320. Block 322 ends routine Router Object on Receipt of Data(DATA).

The flow charts of FIGS. 7 and 8 and the following pseudocode methods present the operative methods of Symbol Objects 208, 210, 212, 214, 216, 218, 220 (FIG. 4). The pseudocode methods for the Symbol Objects are as follows:

---

On Initialization:

create an empty histogram of tick volume by
        price as HIST
    look up yesterday's last price as CLOSE On Receipt of Data (LAST):

Add LAST to HIST
    Recalculate high and low for current day based on HIST
    calculate the difference between LAST and CLOSE
        as CHANGE
    Locate my Screen Display Symbol Object OBJ
    call OBJ:On Receipt of Paint Request

---

Turning to FIG. 7, logic begins at start block 350 indicating the beginning of routine Symbol Object on Initialization. At block 352, an empty histogram HIST is created based upon the tick volume by price of the user selected symbol. Proceeding to block 354, the final price of the user selected symbol of the previous day's trading is stored as CLOSE. Block 356 ends Symbol Object on Initialization.

Turning to FIG. 8, logic begins at block 360 indicating the beginning of routine Symbol Object on Receipt of Data (LAST). At block 362, the most current tick price of the user selected symbol of the current day's trading is stored as LAST. This along with the corresponding tick volume is added to the histogram HIST. Proceeding to block 364, the high and low prices for the user selected symbol of the current day's trading is either calculated or recalculated based on LAST.

The difference of the current price LAST and the closing price CLOSE is calculated in block 366 the result being stored as CHANGE. Continuing with block 368, the Screen Display Symbol Object routine (FIGS. 9 and 10) is executed. Block 370 ends routine Symbol Object on Receipt of Data(LAST).

Figures 9, 10:
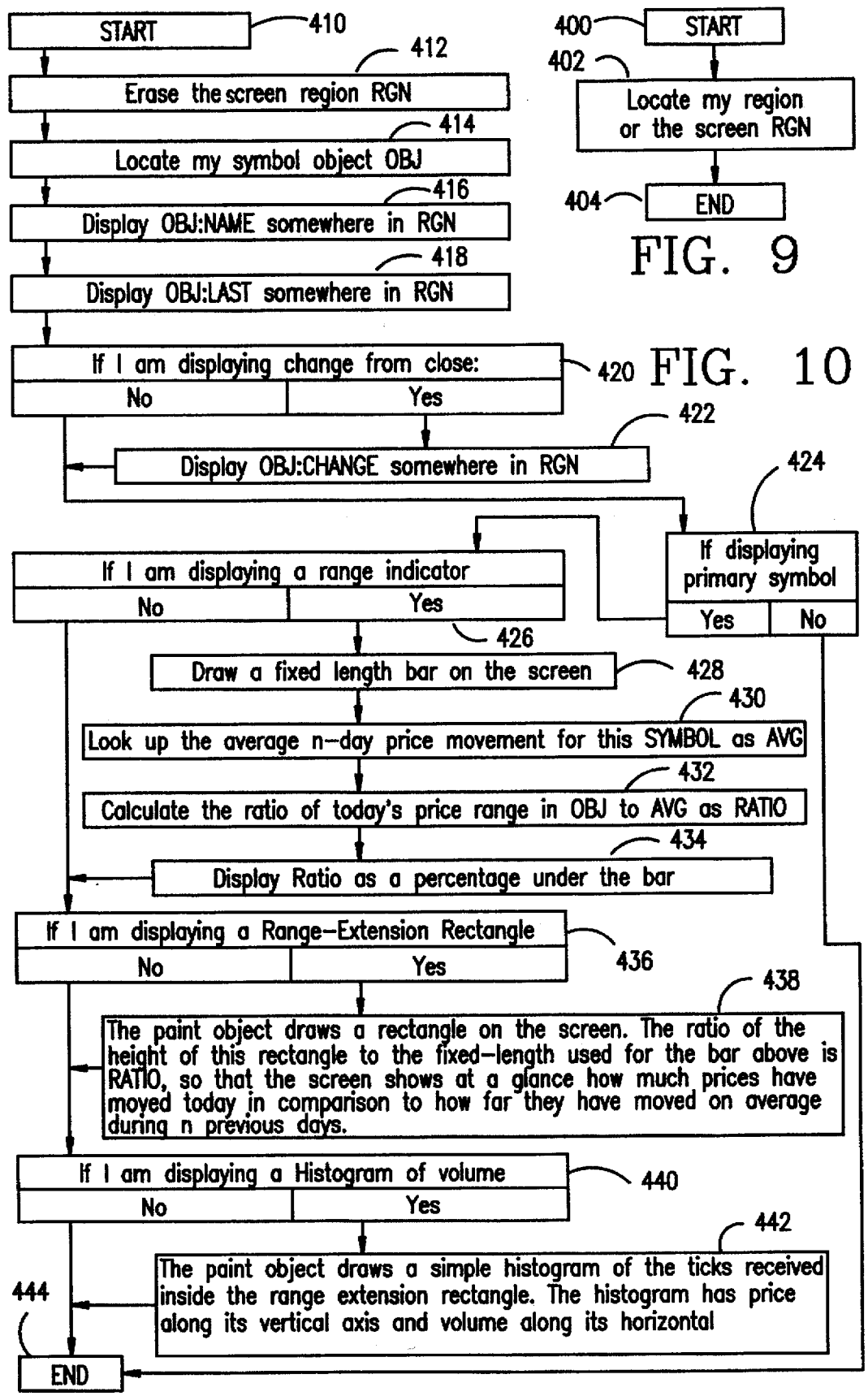
FIG. 9 is a flow chart representation of the Screen Display Symbol Object on Initialization routine.
FIG. 10 is a flow chart representation of the Screen Display Symbol Object on Receipt of Paint Request routine.

The flow charts of FIGS. 9 and 10 and the following pseudocode methods present the operative methods of Screen Display Symbol Objects 222, 224, 226, 228, 230, 232 and 234 (FIG. 4). The pseudocode methods for the Screen Display Symbol Objects are as follows:

---

On Initialization:

Locate my region of the screen RGN

On Receipt of Paint Request:

Clear the screen region RGN
    Locate data object OBJ
        display the instrument name of OBJ
            somewhere in RGN
        display OBJ::LAST somewhere in RGN
        if displaying the change from close
            display OBJ::CHANGE somewhere in RGN
        if displaying a Range Indicator
            draw a fixed-length bar on the screen
            look up the average n-day price movement for
            this instrument as AVG, calculate the ratio
            of today's price range in OBJ to AVG as RATIO
            display RATIO as a percentage under the bar
        if displaying a Range-Extension Indicator
            (The Paint Object draws a rectangle on the
            screen; the ratio of the height of this
            rectangle to the fixed-length used for the
            bar above is RATIO, so that the screen shows
            at a glance how much prices have moved today
            in comparison to how far they have moved on
            average during previous days).
        if displaying a histogram of volume:
            (The Paint Object draws a simple histogram of
            the ticks received inside the range extension
            rectangle. The histogram has price along its
            vertical axis and volume along its
            horizontal axis).

---

Turning to FIG. 9, logic begins at start block 400 indicating the beginning of routine Screen Display Symbol Object on Initialization. At block 402, the region of the screen RGN for displaying the particular market information and symbol is located. Block 404 ends routine Screen Display Symbol Object on Initialization.

Turning to FIG. 10, logic begins at start block 410 indicating the beginning of routine Screen Display Symbol Object on Receipt of Paint Request.

At block 412, the system erases the region of the screen RGN; the system then recalls the user selected symbol, block 414.

Block 416 then displays the user selected symbol within the particular region RGN.

At block 418, the system recalls the most current tick price of the user selected symbol LAST and then displays LAST within the particular region RGN.

At block 420 the system determines whether the user opted to display the change from close CHANGE for the selected symbol. If yes, block 422 then displays the value of CHANGE within the particular region RGN.

Continuing with block 424, the system determines whether this particular commodity information corresponds to the primary symbol as defined by the user. If it does not, block 444 ends routine Screen Display Symbol on Receipt of Paint Request. If the information does correspond to the primary symbol, the system, at block 426, determines whether the user opted to display the range indicator. If the user has opted to display the range indicator, block 428 displays a fixed length bar on the screen in the particular region RGN.

Block 430 calculates AVG, the average price range movement over the past user specified period, such as 20 days. The ratio of the current's days price range and AVG is calculated as RATIO by block 432. Block 434 then displays RATIO as a percentage under the fixed length bar.

Continuing with block 436, the system determines whether the user opted to display the Range Extension Rectangle.

If the user has opted to display the Range Extension Rectangle, block 438 displays a rectangle near the primary symbol with the height of the rectangle being equal to the percentage RATIO of the fixed length bar. This permits the user to quickly compare the current price range with respect to the average price range AVG.

Block 440 determines whether the user opted to display the histogram. If the user has opted to display the histogram, block 442 displays the histogram within the Range Extension Rectangle. Block 444 ends routine Screen Display Symbol Object on Receipt of Paint Request.

The flow charts of FIGS. 11, 12, and 13 and the following pseudocode methods present the operative methods of Calculator Object 204 (FIG. 4). The pseudocode methods for the Calculator Object 204 are as follows:

---

On Initialization:

Create an empty list LIST to hold the last
        price of each instrument

On Receipt of Data (DATA):

Update LIST
    call::On Metric Calculation
        if value has changed then
        locate my Screen Display Angle of Attack
            Indicator Object OBJ
                call OBJ::On Receipt of Paint Request On Metric Calculation:

(The calculator object must be able to perform a
    calculation which will combine the last price values
    for all instruments it receives into a single number.
    This metric is user defined and could be a simple
    weighted average, or a more complicated formula).

---

Turning to FIG. 11, logic begins at start block 450 indicating the beginning of routine Calculator Object on Initialization. An empty list, LIST, is created by block 452, for storing the LAST price associated with the primary and secondary symbols. Block 454 ends routine Calculator Object on Initialization.

Turning to FIG. 12, logic begins at start block 460, indicating the beginning of routine Calculator Object on Receipt of Data(DATA). Block 462 updates LIST created in block 452 with the LAST price associated with each of the primary and secondary symbols. Block 464 calls upon routine Calculator on Metric Calculation (FIG. 13) for calculating a value for the Angle of Attack Indicator. Block 466 determines if that value has changed. If the value has changed, block 468 calls routine Screen Display Angle of Attack Indicator Object on Initialization (FIG. 14) and block 470 calls Screen Display Angle of Attack Indicator Object on Receipt of Paint Request (FIG. 15) to display the appropriate Angle of Attack Indicator. Block 472 ends routine Calculator on Receipt of Data(DATA).

Turning to FIG. 13, logic begins at start block 480, indicating the beginning of routine Calculator Object on Metric Calculation. Block 482 calculates the scaler value or the metric value MET by performing the user defined calculations in determining the weighting values for the momentum and direction of the primary and secondary symbols. Block 484 ends routine Calculator on Metric Calculation.

Figure 14:
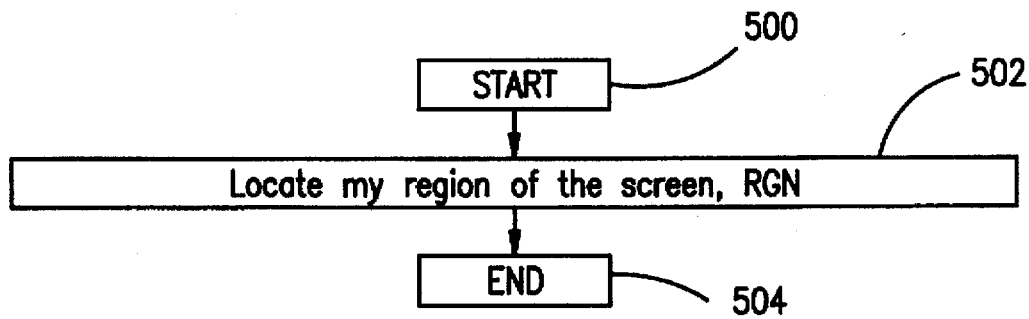
FIG. 14 is a flow chart representation of the Screen Display Angle of Attack Indicator Object on Initialization routine.
Figure 15:
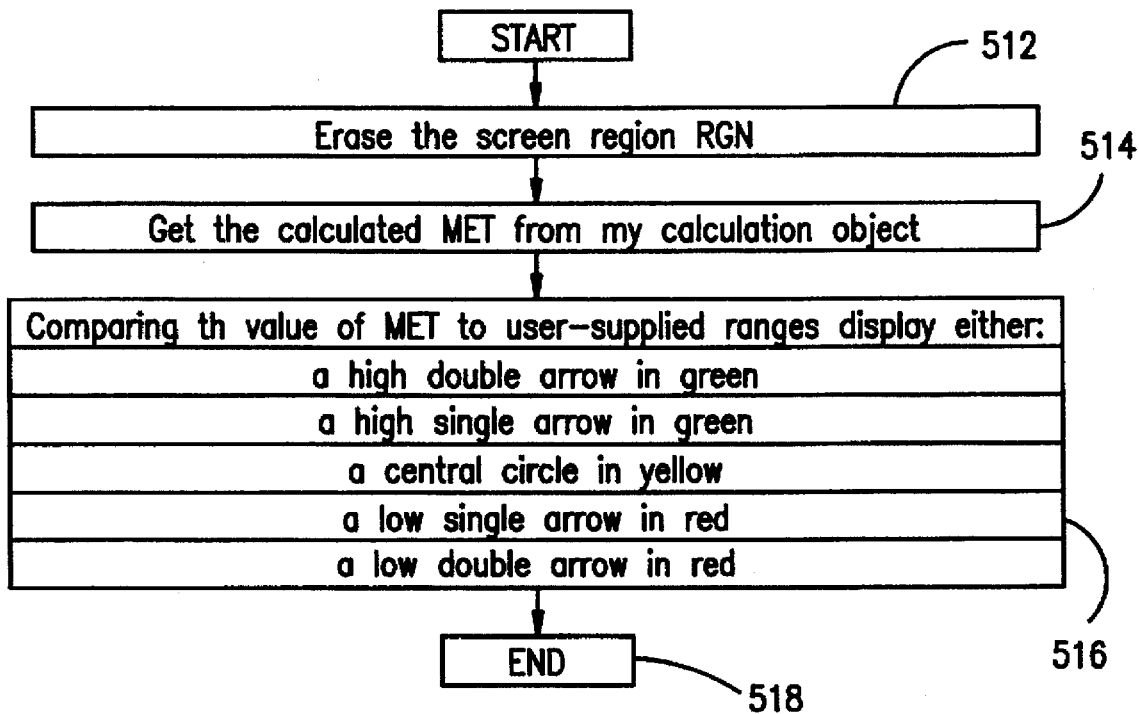
FIG. 15 is a flow chart representation of the Screen Display Angle of Attack Indicator Object on Receipt of Paint Request routine.

The flow charts of FIGS. 14 and 15 and the following pseudocode methods present the operative methods of Screen Display Angle of Attack Indicator Object 206 (FIG. 4). The pseudocode methods for the Screen Display Angle of Attack Indicator Object 204 are as follows:

---

On Initialization:

Locate my region of the screen, RGN

On Receipt of Paint Request:

Erase the screen region RGN
    Get the calculated metric MET from my calculation
        object
    Comparing the value of metric MET to user-supplied
        ranges display either:
        a high double arrow in green
        a high single arrow in green
        a central circle in yellow
        a low single arrow in red
        a low double arrow in red

---

Turning to FIG. 14, logic begins at start block 500, indicating the beginning of routine Screen Display Angle of Attack Indicator Object on Initialization. Block 502 locates the appropriate region of the display screen RGN for displaying the Angle of Attack Indicator. Block 504 ends routine Screen Display Angle of Attack Indicator Object on Initialization.

Turning to FIG. 15, logic begins at start block 510, indicating the beginning of routine Screen Display Angle of Attack Indicator Object on Receipt of Paint Request. Block 514 recalls the calculated MET value of FIG. 13, block 482. Block 516 then compares the MET value to the user supplied ranges and then displays the appropriate indicator, either a double arrow up, single arrow up, central circle, a single arrow down, or a double arrow down. Block 518 ends routine Screen Display Angle of Attack Indicator Object on Receipt of Paint Request.

Turning now to FIGS. 16–22, the block diagrams of the Screen Object are presented. The Screen Object primarily defines the regions of screen display 60 (FIG. 2) in an ergonomic arrangement for displaying the information. It reorganizes the screen display upon addition or deletion of a symbol, and updates the screen display when a new primary symbol is chosen.

The flow charts of FIGS. 16, 17, 18, 19, 20, 21 and 22 and the following pseudocode methods present the operative methods of The Screen Object. The pseudocode methods for the Screen Object are as follows:

On Initialization:

Assign the Primary Symbol to a region in the center of
    the screen
    Assign Secondary Symbols to regions peripheral
      to Primary Symbol region
    If the Angle of Attack Indicator has been selected
      Assign the Angle of Attack Indicator to region
      next to the Primary Symbol region
On Complete Repaint Request:

For Each Symbol SYMBOL
      call SYMBOL::On Receipt of Paint Request
    (The screen can optionally paint spokes, 3-D shading,
and a variety of other visual enhancing techniques)
On Addition of a new Symbol:

Re-Assign the Secondary Symbols to regions peripheral
      to Primary Symbol region
On receiving a mouse click over a symbol SYM:

if SYM is a secondary symbol
      Make SYM Primary
      Make the old Primary Symbol Secondary
      Re-Initialize
      Re-Paint
To Make a Symbol SYM Primary:

Enable SYM's Range-Extension Rectangle
    if the user has selected histograms
      Enable SYM's histogram display
    if the user has selected reference bars
      Enable SYM's reference bar
To Make a Symbol SYM Secondary:

Disable all features except Price Display, and if the
    user has selected it Change from Close
In Response to other User Commands:

(In Response to user commands, enable Change From
    Close, Range Extension Rectangles, or disable them
    as appropriate. Locate the appropriate object and
    set a flag. Upon repaint, the object will draw
    itself correctly.)

Figure 16:
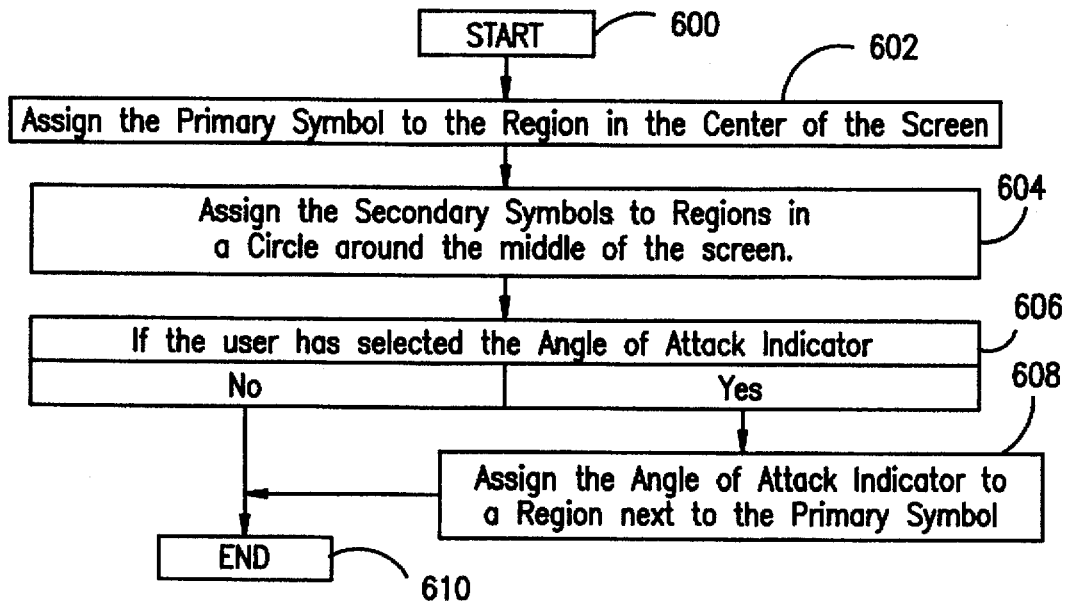
FIG. 16 is a flow chart representation of the Screen Object on Initialization routine.

Turning to FIG. 16, logic begins at start block 600, indicating the beginning of routine Screen Object on Initialization.

Block 602 assigns a region in the center of the screen to the primary symbol.

Block 604 assigns regions to each of the secondary symbols which are peripheral to the region for the primary symbol.

Block 606 determines whether the user has opted to display the Angle of Attack Indicator. If the user has opted to display the Angle of Attack Indicator, block 608 assigns a region for displaying the Angle of Attack Indicator, which is next to the region for the primary symbol. Block 610 ends routine Screen Object on Initialization.

Figure 17:
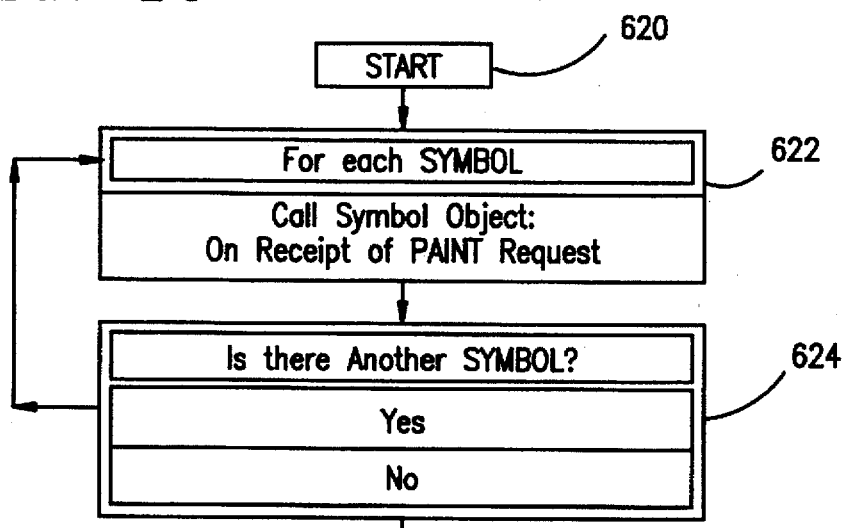
FIG. 17 is a flow chart representation of the Screen Object on Complete Repaint Request routine.

Turning to FIG. 17, logic begins at start block 620, indicating the beginning of routine Screen Object on Complete Repaint Request. Block 622 calls routine Screen Display Symbol on Receipt of Paint Request (FIG. 10) for updating a particular symbol and its market information. Block 624 determines whether each of the primary and secondary symbols have been updated. If there are additional symbols to be repainted or updated, block 622 is recalled, else block 626 ends routine Screen Object on Complete Repaint Request.

Figure 18:
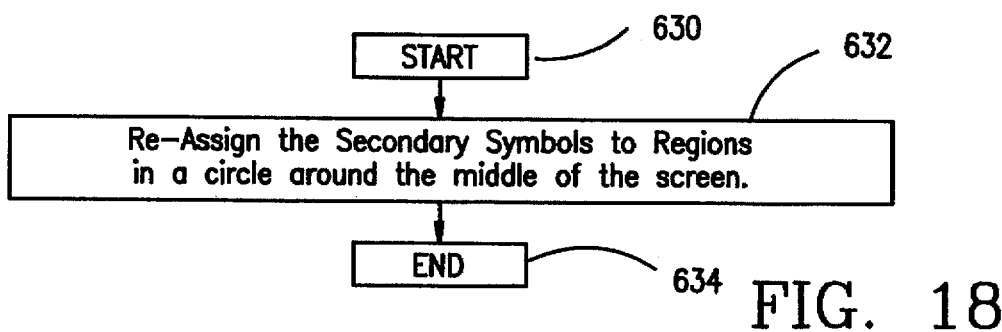
FIG. 18 is a flow chart representation of the Screen Object on Addition of a New Symbol routine.

Turning to FIG. 18, logic begins at start block 630, indicating the beginning of routine Screen Object on addition of a new symbol. Block 632 reassigns regions to each of the secondary symbols, including the new symbol, which are peripheral to the region for the primary symbol. Block 634 ends routine Screen Object on addition of a New Symbol.

Figure 19:
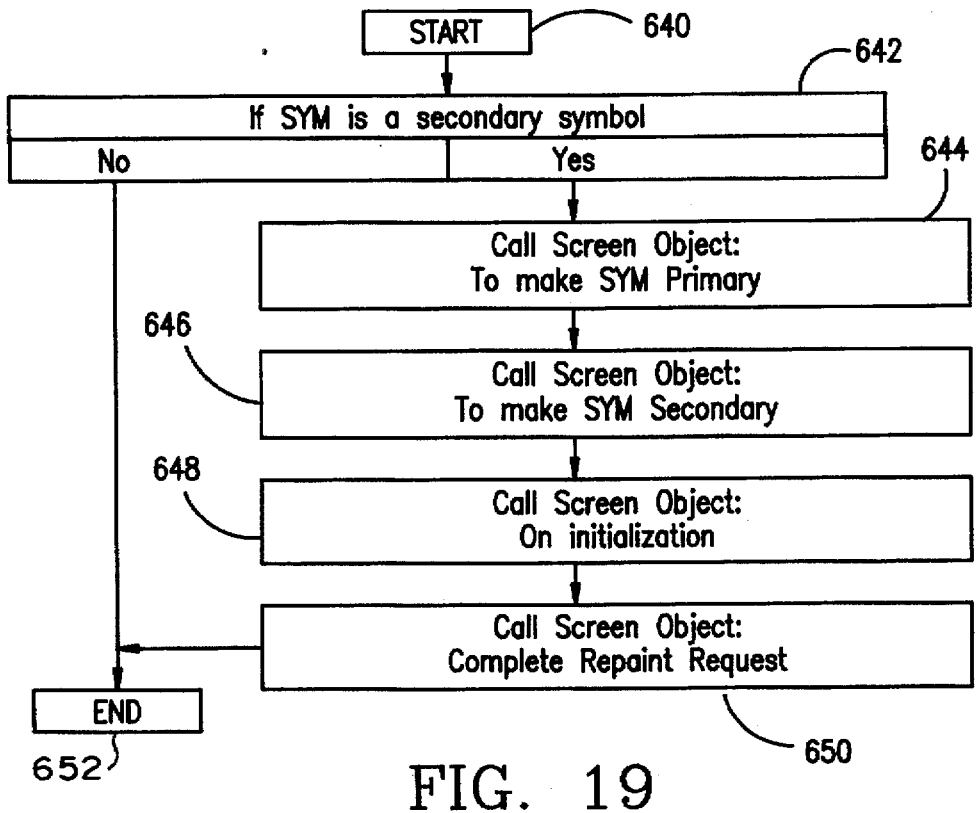
FIG. 19 is a flow chart representation of the Screen Object on Receiving a Mouse Click over a symbol SYM routine.
Figure 20:
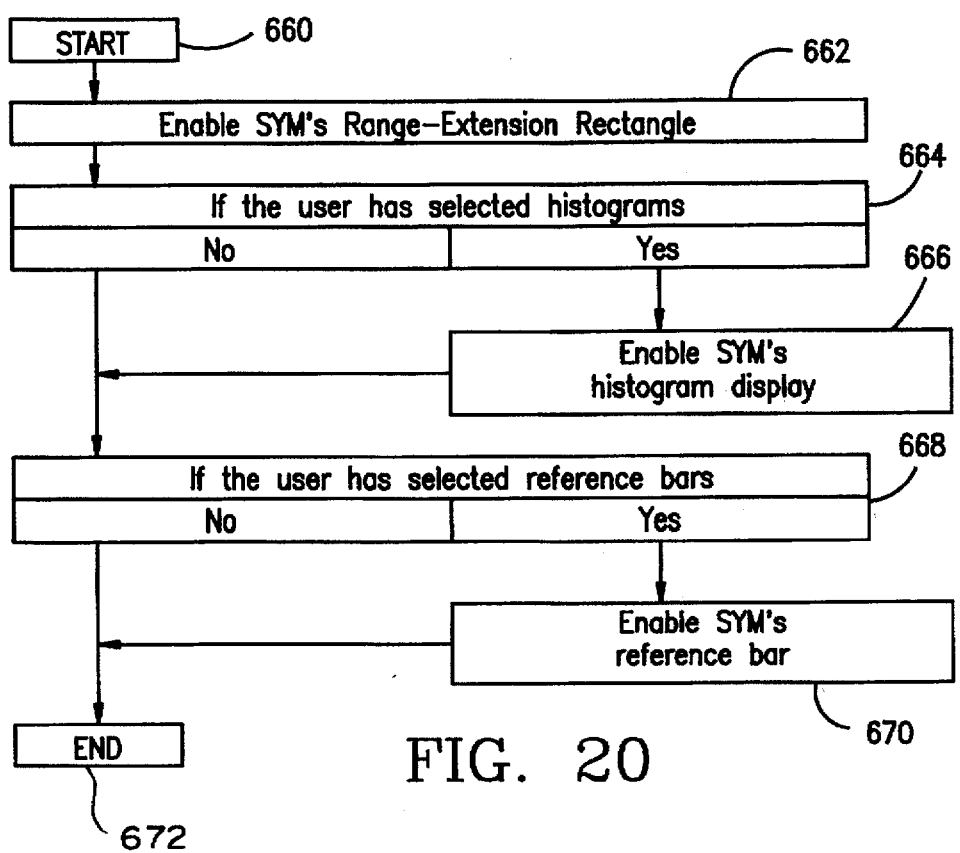
FIG. 20 is a flow chart representation of the Screen Object to Make a SYM Primary routine.
Figure 21:
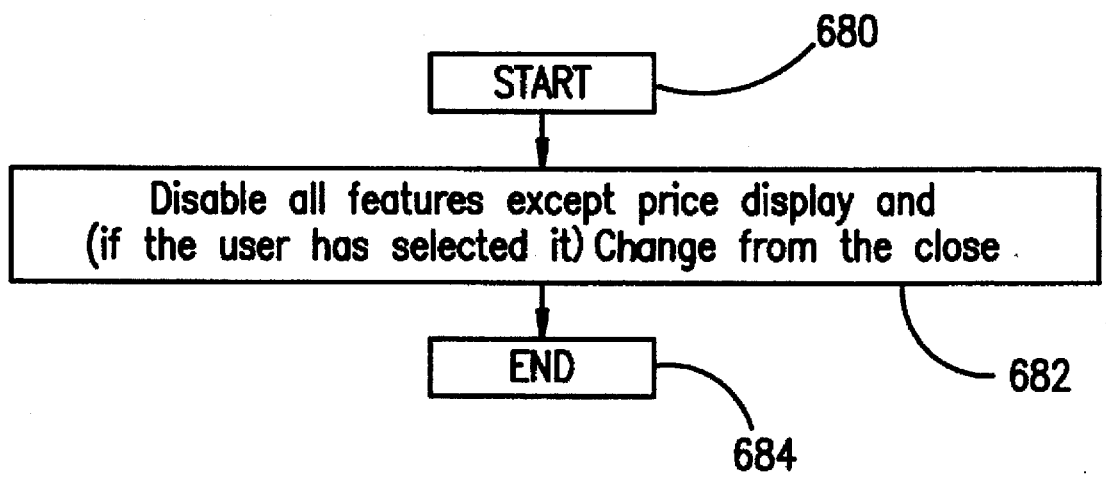
FIG. 21 is a flow chart representation of the Screen Object to make a SYM Secondary routine.

Turning to FIGS. 19-21, logic begins at start block 640, indicating the beginning of routine Screen Object on Receiving a Mouse Click over a symbol SYM. This routine changes a secondary symbol to a primary symbol and changes the current primary symbol to a secondary symbol. Block 642 determines if the symbol SYM clicked upon by the mouse is either a primary or secondary symbol. If SYM is a secondary symbol, block 644 calls routine Screen Object to make a SYM primary (FIG. 20) making the chosen secondary symbol the primary symbol.

Block 646 calls routine Screen Object to make a SYM secondary (FIG. 21) making the current primary symbol a secondary symbol.

Block 648 calls routine Symbol Object on Initialization (FIG. 16) to reassign the screen regions according to the new primary and secondary symbol. Block 650 calls routine Screen Object on complete repaint request (FIG. 17) to update the new screen display with the new primary and secondary symbols. Block 652 ends routine Screen Object on Receiving a Mouse Click over a symbol SYM.

Turning to FIG. 20, logic begins at start block 660, indicating the beginning of routine Screen Object to make a SYM primary. This routine enables the various indicators associated with the new primary symbol. Block 662 enables the Range Extension Rectangle of the new primary symbol. Block 664 determines if the user has opted to display the histogram for the primary symbol. If the user has opted to display the histogram, block 666 enables the histogram for the new primary symbol. Block 668 determines if the user has opted to display the range indicators. If the user has opted to display the range indicators, block 670 enables the range indicators for the new primary symbol. Block 672 ends routine Screen Object to make a SYM primary.

Turning now to FIG. 21, logic begins at start block 680, indicating the beginning of routine Screen Object to make a SYM secondary. Block 682 disables the new secondary symbol's various indicators displays which were displayed when the primary symbol. Block 684 ends routine Screen Object to make a SYM secondary.

Figure 22:
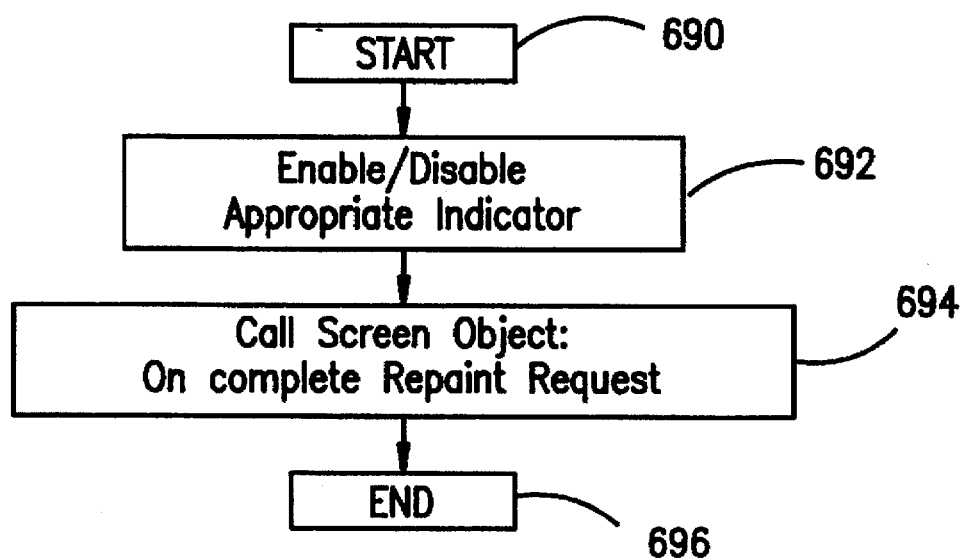
FIG. 22 is a flow chart representation of the Screen Object in Response to Other Commands routine.

Turning now to FIG. 22, logic begins at start block 690, indicating the beginning of routine Screen Object in response to other commands. When the user issues a command other than switching a secondary symbol to a primary symbol, this routine updates the display accordingly. Block 692 determines from the user command which of the various indicators of the primary and secondary symbols are to be enabled or disabled. Block 694 calls the routine Symbol Object on Complete Repaint Request (FIG. 17) to update the screen display with the appropriate indicators either enabled or disabled. Bock 696 ends routine Screen Object in response to other commands.

The source code listings of program P written in C++ is attached herewith as an appendix and is incorporated herein by reference.

An example of what primary display region 70 of display screen 60 of FIG. 2 might look like over a period of time with the histogram disabled is shown in FIGS. 23A–D.

Figure 23A:
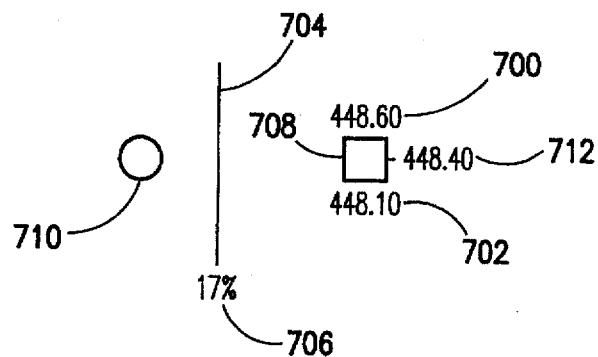
FIGS. 23A, 23B, 23C & 23D are illustrative examples of one embodiment of the primary region of a multi-object display of the present invention over a period of time.

Turning first to FIG. 23A, an example of a screen display just 1 minute after the market opens or 8:31 am CST is presented.

The market opens on a print, and then starts extending. Assume the median range for the primary symbol for 30 days is 3 points, and after 1 minute, the high 700 is 448.60, and the low 702 is 448.10. The fixed length bar 704 is displayed with 17% displayed below representing the RATIO 706 of today's price range to the average 30 day price range. The length of the Range Extension Rectangle 708 is drawn as 17% of the fixed length bar 704. A central circle 710 is displayed for the Angle of Attack Indicators as the current market direction is neutral. The current price 712 of the primary symbol is displayed as 448.40. The user would now be continuously scanning or monitoring the spokes or secondary symbols (not shown) for indications of the market trends.

Figure 23B:
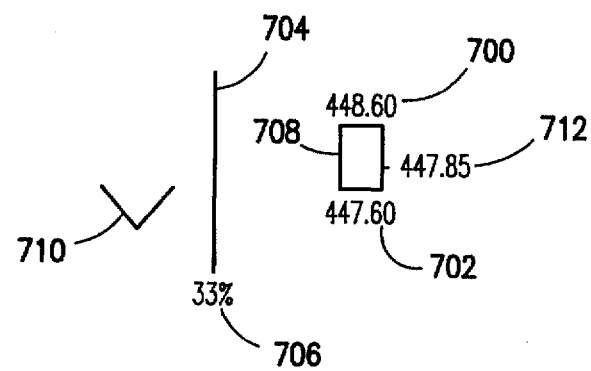

Turning next to FIG. 23B, a representation of the display of FIG. 23A is now shown 14 minutes later or 8:45 am CST. The RATIO has changed and is now displayed as 33%. The current day's high price 700 has remained the same, but the current day's low price 702 has now changed to 447.60. The direction of the Angle of Attack Indicator has been determined by the slightly lower price action and momentum and is represented by a single down arrow 710. The current price 712 is being displayed as 447.85. Note the length of the Range Extension Rectangle 708 has increased with the increased RATIO 706.

Figure 23C:
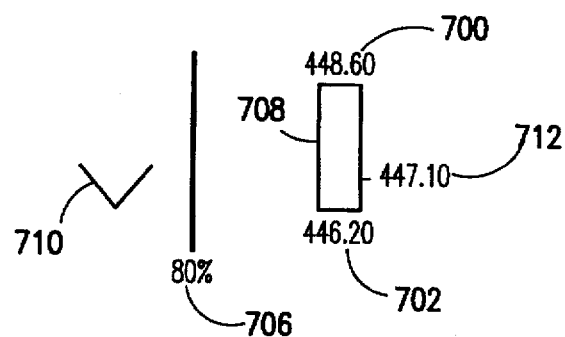

Turning to FIG. 23C, a representation of the display of FIGS. 23A & 23B is now shown at 9:50 am CST. The RATIO 706 has changed again as is now displayed as 80%. The current day's high 700 has remained the same, but the current's days low price 702 has now changed to 446.20. The direction of the Angle of Attack Indicator has been determined by the slightly lower price action and is represented by a single down arrow 710. The current price 712 is being displayed as 447.10. Again the length of the Range Extension Rectangle 708 has increased corresponding to the increased RATIO 706.

Figure 23D:
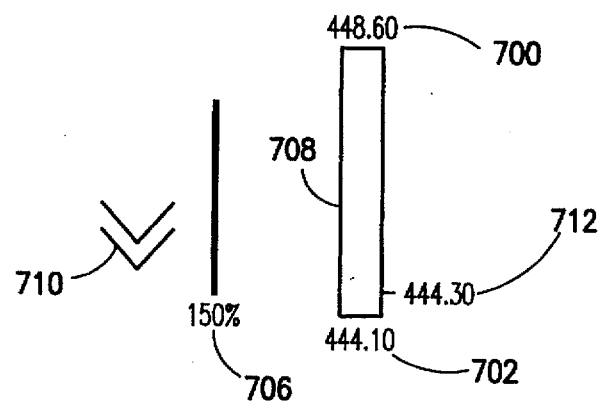

Turning to FIG. 23D, a representation of the display of FIGS. 23A, 23B & 23C is now shown at 11:00 am CST. The RATIO 706 has changed again and is now displayed as 150%. The current day's high 700 has remained the same, but the current day's low price 702 has changed again, and is now displayed as 444.10. The direction of the Angle of Attack Indicator has been determined by the selling pressure and the increased short term volatility and is represented by a double down arrow 710. The current price 712 is being displayed as 444.30. The length of the Range Extension Rectangle 708 has again increased corresponding to the increased RATIO 706.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A device for processing and displaying financial market data corresponding to user selected primary and secondary symbols, comprising:
    a) a programmable computer including a display;
    b) a communication device connected to said computer for receiving financial market data from an external data source; and
    c) said programmable computer including software for selecting the primary and secondary symbols from the financial market data and displaying the data corresponding to the primary symbol on a central portion of said display and displaying the data corresponding to the secondary symbols on a peripheral portion of said display in a hub-and-spoke configuration and periodically updating the data corresponding to the selected primary and secondary symbols.

2. A device as recited in claim 1, wherein:
    a) said software is adapted for displaying a first graphic indicator within the central portion of said display, said first graphic indicator corresponding to the strength or weakness of the market conditions affecting the selected primary symbol.

3. A device as recited in claim 2, wherein:
    a) said first graphic indicator includes a circle when the market conditions are neutral.

4. A device as recited in claim 2, wherein:
    a) said first graphic indicator includes an arrow pointing upwardly or downwardly when the market conditions are affecting the strength or weaknesses, respectively, of the selected primary symbol.

5. A device as recited in claim 2, wherein:
    a) said software is adapted for displaying second and third graphic indicators within the central portion of the display, said second and third graphic indicators representing current day's price action relative to previous days' price action for the selected primary symbol.

6. A device as recited in claim 5, wherein:
    a) said second graphic indicator includes a bar of fixed length corresponding to the average price movement of the selected primary symbol over a number of previous days.

7. A device as recited in claim 5, wherein:
    a) said third graphic indicator includes a rectangle with one side corresponding to the price movement of the selected primary symbol for the current day.

8. A method for processing and displaying financial market data corresponding to user selected primary and secondary symbols, comprising the steps of:
    a) providing a programmable computer including a display and a communication device;
    b) receiving financial market data corresponding to the selected primary and secondary symbols from an external data source through the communication device;
    c) inputing the received data to the computer;
    d) displaying the selected data corresponding to the selected primary symbol within a central portion of the display;
    e) displaying the selected data corresponding to the selected secondary symbols within a portion of the display peripheral to the central portion of the display in a hub-and-spoke configuration; and
    f) periodically updating the displayed data from the external data source.

9. The method of claim 8, and further including the step of:
    a) displaying a first graphic indicator within the central portion of the display, said first graphic indicator corresponding to the strength or weakness of the market conditions affecting the selected primary symbol.

10. The method of claim 9, and further including the step of:
    a) displaying second and third graphic indicators within the central portion of the display, said second and third graphic indicators representing current day's price action relative to previous days' price action for the selected primary symbol.

11. The method of claim 10, wherein:
    a) said second graphic indicator is a bar of fixed length corresponding to the average price movement of the selected primary symbol over a number of previous days.

12. The method of claim 10, wherein:

a) said third graphic indicator is a rectangle with one side corresponding to the price movement of the selected primary symbol for the current day.

13. The method as recited in claim 10, and further including the steps of:

a) calculating the ratio of the current day's price range of the primary symbol to the average price movement of said primary symbol over a number of previous days;

b) displaying the calculated ratio adjacent said second graphic indicator; and c) said second graphic indicator includes a variable sized rectangle with the size of said rectangle corresponding to the price movement of the selected primary symbol for the current day.

14. The method as recited in claim 10, further including the step of:

a) displaying the current day's high and low trading corresponding to selected primary symbol adjacent said third graphic indicator.

15. The method of claim 9, wherein:

a) said first graphic indicator is a circle when the market conditions are neutral.

16. The method of claim 9, wherein:

a) said first graphic indicator is an arrow pointing upwardly or downwardly when the market conditions are affecting the strength or weaknesses respectively of the selected primary symbol.

17. The method as recited in claim 8, wherein:

a) said step of displaying the selected data corresponding to the selected primary symbol includes displaying the current trading price corresponding to the selected primary symbol.

18. The method as recited in claim 8, wherein:

a) said step of displaying the selected data corresponding to the selected primary symbol includes displaying the current day's net change in price corresponding to the selected primary symbol.

19. The method as recited in claim 8, wherein:

a) said step of displaying the selected data corresponding to the selected secondary symbols includes displaying the current trading price corresponding to each of the selected secondary symbols.

20. The method as recited in claim 8, wherein:

a) said step of displaying the selected data corresponding to the selected secondary symbols includes displaying the current day's net change in price corresponding to each of the selected secondary symbols.

* * * * *